United States Patent
Sagong et al.

(10) Patent No.: US 10,755,004 B2
(45) Date of Patent: Aug. 25, 2020

(54) METHOD AND APPARATUS FOR MODELING OBJECT

(71) Applicant: SAMSUNG ELECTRONICS CO., LTD., Suwon-si (KR)

(72) Inventors: Donghoon Sagong, Suwon-si (KR); Nahyup Kang, Seoul (KR); Minjung Son, Suwon-si (KR); KeeChang Lee, Seongnam-si (KR); Hyong Euk Lee, Suwon-si (KR); Heesae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 15/241,395

(22) Filed: Aug. 19, 2016

(65) Prior Publication Data

US 2017/0098016 A1 Apr. 6, 2017

(30) Foreign Application Priority Data

Oct. 1, 2015 (KR) .................. 10-2015-0138736
Nov. 6, 2015 (KR) .................. 10-2015-0155935

(51) Int. Cl.
  *G06F 30/20* (2020.01)
  *G06T 13/60* (2011.01)
  *G06F 111/08* (2020.01)

(52) U.S. Cl.
  CPC .............. *G06F 30/20* (2020.01); *G06T 13/60* (2013.01); *G06F 2111/08* (2020.01); *G06T 2210/24* (2013.01); *G06T 2210/56* (2013.01)

(58) Field of Classification Search
  CPC ............ G06F 17/5009; G06F 2217/16; G06F 2217/10; G06F 30/20; G06F 2111/08;
  (Continued)

(56) References Cited

U.S. PATENT DOCUMENTS 8,878,856 B1 * 11/2014 Chentanez .............. G06T 13/00
  345/473
8,947,430 B1   2/2015 Green et al.
(Continued)

FOREIGN PATENT DOCUMENTS

KR   10-2005-0052707 A   6/2005
KR   10-2009-0027142 A   3/2009

OTHER PUBLICATIONS

Tsai et al. "Modeling Bed-Load Transport by a Three-State Continuous-Time Markov Chain Model" Journal of Hydraulic Engineering, p. 1265-1276 (Dec. 2013) [retrieved on 2018—Aug. 29, 2018]. Retrieved from <https://ascelibrary.org/doi/10.1061/%28ASCE%29HY.1943-7900.0000764> (Year: 2013).*

(Continued)

*Primary Examiner* — Rehana Perveen
*Assistant Examiner* — Alfred H B Wechselberger
(74) *Attorney, Agent, or Firm* — NSIP Law

(57) ABSTRACT

A method of modeling an object includes defining a state transition probability and a state of each of a plurality of particles forming the object; changing a state of a particle defined to be in a first state among the plurality of particles to a second state; applying a movement model to a particle defined to be in the second state among the plurality of particles; and changing a state of the particle defined to be in the second state to the first state based on the state transition probability.

51 Claims, 13 Drawing Sheets

(58) Field of Classification Search
CPC . G06T 13/60; G06T 2210/56; G06T 2210/24; G06T 13/00

See application file for complete search history.

(56) References Cited

U.S. PATENT DOCUMENTS

| | | | | |
|---|---|---|---|---|
| 10,290,116 | B2* | 5/2019 | Laugier | B60T 7/22 |
| 2008/0319722 | A1* | 12/2008 | Anderson | G06F 17/5009 703/2 |
| 2009/0083015 | A1* | 3/2009 | McDaniel | G06F 17/5009 703/6 |
| 2009/0267951 | A1* | 10/2009 | Chang | G06T 13/60 345/474 |
| 2012/0316848 | A1 | 12/2012 | Noh et al. | |

OTHER PUBLICATIONS

Farahat et al. "Estimation of State-Transition Probability in Matrices in Asynchronous Population Markov Processes" 2010 American Control Conference, FrC07.6 (Jul. 2010) [retrieved on Aug. 31, 2018]. Retrieved from <https://ieeexplore.ieee.org/document/5531431/> (Year: 2010).*

Ni et al. "Research on Flame Simulation Based on Improved Particle System and the Texture Mapping" Applied Mechanics and Materials, vol. 44-47, pp. 3601-3605, doi: 10.4028/www.scientific.net.AMM.44-47.3601 [retrieved on Aug. 30, 2018]. Retrieved from <https://www.scientific.net/AMM.44-47.3601> (Year: 2010).*

Lei et al. "A Particle-Guided Method for Animating Splashing Stream Water in Real Time" Poster Proceedings of Pacific Graphics (2008) [retrieved on Aug. 30, 2018]. Retrieved from <http://www.cs.nthu.edu.tw/~chunfa/PG08_1227.pdf> (Year: 2008).*

Boudec et al. "A Generic Mean Field Convergence Result for System of Interacting Objects" Fourth International Conference on the Quantitative Evaluation of Systems, doi: 10.1109/QEST.007.8 [retrieved on Aug. 29, 2018]. Retrieved from <https://ieeexplore.ieee.org/document/4338232/?source=IQplus> (Year: 2007).*

Yang et al. "Hybrid Particle-grid Modeling for Multi-scale Droplet/Spray Simulation" Pacific Graphics 2014, vol. 33, No. 7, doi: 10.1111/cgf.12488 [retrieved on Aug. 29, 2018]. Retrieved from <https://onlinelibrary.wiley.com/doi/epdf/10.1111/cgf.12488> (Year: 2014).*

Takahashi et al. "Realistic Animation of Fluid with Splash and Foam" Eurographics 2003 [retrieved on Aug. 30, 2018]. Retrieved from <https://onlinelibrary.wiley.com/doi/pdf/10.1111/1467-8659.00686> (Year: 2003).*

Winnebeck, J. "Particle System Memory Allocation." [blog] Gillus's Programming [retrieved on Sep. 14, 2018]. Retrieved from <http://gillius.org/articles/partmem.htm> (Year: 2004).*

Allen et al. "Computer Simulation of Liquids" Chapter 4 and Chapter 7, Section 7.3, Oxford University Press [retrieved on Apr. 3, 2019]. Retrieved from <https://datagrid.hu/boda/Boda-sajat/Rush/Books/Allen-Tildesley.pdf> (Year: 1987).*

Nugjgar et al. "Markov-type velocity field for efficiently animating water" Vis Comput, vol. 28, pp. 219-229; doi: 10.1007/s00378-011-0637-0 [retrieved on Apr. 2, 2019]. Retrieved from <https://www.researchgate.net/publication/220067438_Markov-type_velocity_field_for_efficiently_animating_water_stream> (Year: 2012).*

Nugjgar et al. "Markov-type velocity field for efficiently animat . . . " Vis Comput, vol. 28, pp. 219-229; doi: 10.1007/s00378-011-06370 [retrieved on Apr. 2, 2019]. Retrieved from <https://www.researchgate.net/publication/220067 438_Markov-type_velocity_field_for_efficiently_animating_water stream> (Year: 2012).*

Thurey et al. "Animation of Open Water Phenomena with coupled Shallow Water and Free Surface Simulations" Eurographics/ACM Siggraph, pp. 157-165 [retrieved on Apr. 5, 2019]. Retrieved from <https://dl.acm.org/citation.cfm?id=1218086> (Year: 2006).*

Orkoulas, G. "An Overview of Monte Carlo Methods for Fluid Simulation" Computing in Science and Engineering, vol. 11, Iss. 5, pp. 76-87 [retrieved on Apr. 5, 2019]. Retrieved from <https://ieeexplore.ieee.org/document/5228720> (Year: 2009).*

Allen et al. "Computer Simulation of Liquids" Chapter 4 and Chapter 7, Oxford University Press [retrieved on Apr. 3, 2019]. Retrieved from <https://datagrid.hu/boda/Boda-sajat/Rush/Books/Allen-Tildesley.pdf> (Year: 1987).*

Rudomin et al. "Probabilistic, layered and hierarchical animated agents using XML" Graphite '05, pp. 113-116 [retrieved on Oct. 10, 2019]. Retrieved from <https://dl.acm.org/citation.cfm?id=1101409> (Year: 2005).*

Moore et al. "Visual Crowd Surveillance through a Hydrodynamics Lens" Comm. of the ACM, vol. 54, Iss. 12, pp. 64-73 [retrieved on Oct. 11, 2019]. Retrieved from <https://dl.acm.org/citation.cfm?id=2043192> (Year: 2011).*

Huang et al. "Efficient fluids simulation and rendering on GPU" VRCAI '13, pp. 25-30 [retrieved on Oct. 10, 2019]. Retrieved from <https://dl.acm.org/citation.cfm?id=2534330> (Year: 2013).*

Lerner et al. "Behaviors to Pedestrian Simulations" Siggraph Symp. on Computer Animation [retrieved on Oct. 10, 2019]. Retrieved from <https://dl.acm.org/citation.cfm?id=1599496> (Year: 2009).*

Latta, L. "Building a Million Particle System" [article] Massive Develoment GmbH [retrieved on Apr. 4, 2019]. Retrieved from <http://www.2ld.de/gdc2004/MegaParticlesPaper.pdf> (Year: 2004).*

Anonymous: "particle finite state machine" Mar. 1, 2010, pp. 1-2, XP55341534, URL: http://forums.odforce.net/topic/10752-particle-finite-state-machine/, post of Raytheon on p. 1. (2 pages in English).

Extended European Search Report dated Feb. 9, 2017 in counterpart European Application No. 16191878.4. (9 pages in English).

Information about "Kids Mode" app deployed on Galaxy Apps website on Sep. 7, 2015, Samsung Electronics Co., Ltd. (5 pages, partially in English, partially in Korean).

Gareny et al., "CPU Bound: Memory", *Video Optimization*, pp. 109-135 (27 pages in English).

European Office Action dated Jul. 11, 2019 in corresponding European Patent Application No. 16191878.4. pp. 1-6 (6 pages in English).

\* cited by examiner

METHOD AND APPARATUS FOR MODELING OBJECT

CROSS-REFERENCE TO RELATED APPLICATION(S)

This application claims the benefit under 35 USC 119(a) of Korean Patent Application Nos. 10-2015-0138736 filed on Oct. 1, 2015, and 10-2015-0155935 filed on Nov. 6, 2015, in the Korean Intellectual Property Office, the entire disclosures of which are incorporated herein by reference for all purposes.

BACKGROUND

1. Field

The following description relates to a method and an apparatus for modeling an object.

2. Description of Related Art

Research has been ongoing to numerically solve for a flow of a fluid in a fluid simulation in a computer graphics (CG) field, in particular, in a visual effects (VFX) field.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of modeling an object includes defining a state transition probability and a state of each of a plurality of particles forming the object; changing a state of a particle defined to be in a first state among the plurality of particles to a second state; applying a movement model to a particle defined to be in the second state among the plurality of particles; and changing a state of the particle defined to be in the second state to the first state based on the state transition probability.

The method may further include adjusting the state transition probability based on statistical information associated with the particle defined to be in the first state.

The adjusting of the state transition probability may include monitoring a memory size occupied by particles in the first state; and determining the state transition probability based on the memory size.

The adjusting of the state transition probability may include comparing the statistical information to a preset threshold; and determining the state transition probability based on a result of the comparing.

The determining of the state transition probability based on the result of the comparing may include increasing a probability of a transition of a particle to the first state in response to the statistical information being less than the threshold; and decreasing the probability of the transition of a particle to the first state in response to the statistical information being equal to or greater than the threshold.

The changing of the state of the particle defined to be in the first state to the second state may include setting a position and a velocity of the particle changed to be in the second state to be an initial position and an initial velocity of the particle changed to be in the second state in a scene.

The method may further include maintaining constant a memory size occupied by particles in the second state.

The method may further include applying the movement model to the particle defined to be in the second state and changing the state of the particle defined to be in the second state to a third state based on the state transition probability; and applying the movement model to a particle defined to be in the third state and changing a state of the particle defined to be in the third state to the first state based on the state transition probability.

The applying of the movement model to the particle defined to be in the second state and changing of the state of the particle defined to be in the second state to the third state may include changing the state of the particle defined to be in the second state to the third state based on the state transition probability in response to the particle defined to be in the second state interacting with another object.

The third state may be a state that is changed from the second state and in which particles represent a subordinate flow of a fluid in a virtual space.

The method may further include defining any one or any combination of any two or more of a size, a material, a shape, and a property of each of the plurality of particles.

The changing of the state of the particle defined to be in the first state to the second state may include changing, to be in the second state, a number of particles defined to be in the first state equal to a number of particles designated for each frame of a scene.

The method may further include displaying the object based on the plurality of particles.

The object may be a fluid represented in a virtual space, and the plurality of particles may be used to represent the fluid.

The first state may be a state in which a particle is temporarily stored in a memory after representation of the particle in a scene is terminated.

The second state may be a state in which particles represent a representative flow of a fluid in a virtual space.

In another general aspect, a non-transitory computer-readable medium stores instructions to cause computing hardware to perform the method described above.

In another general aspect, a method of modeling an object includes changing a state of at least one of particles in a first state to a second state; generating an object based on a particle in the second state; applying a movement model to the particle in the second state; and changing a state of the particle in the second state to the first state based on a state transition condition using a result of the applying.

The method may further include changing the state of the particle in the second state to another state in response to the particle in the second state reaching a predetermined space in a scene.

The method may further include changing the state of the particle in the second state to another state based on a state transition probability in response to the particle in the second state interacting with another object.

The method may further include monitoring statistical information associated with particles; and adjusting the state transition condition based on the statistical information.

The adjusting of the state transition condition may include comparing the statistical information to a preset threshold; and adjusting the state transition condition based on a result of the comparing.

The adjusting of the state transition condition may include adjusting any one or any combination of any two or more of a size, a shape, and a position of a space that is set in a scene and in which the state of the particle in the second state is set to be changed to another state according to a state transition probability.

The method may further include continuing to apply the movement model to the particle in the second state in response to the particle in the second state remaining in the second state.

The method further may further include changing the state of the particle in the second state to a third state based on the state transition condition using the result of the applying; applying the movement model to a particle in the third state; and changing the state of the particle in the third state to the first state based on the state transition condition using a result of the applying of the movement model to the particle in the third state; wherein the generating of the object includes generating the object based on the particle in the second state and the particle in the third state.

The changing of the state of the at least one of the particles in the first state to the second state may include changing, to be in the second state, a number of particles defined to be in the first state equal to a number of particles designated for each frame of a scene; and setting a position and a velocity of the particles changed to be in the second state to be an initial position and an initial velocity in the scene.

The changing of the state of the at least one of the particles in the first state to the second state may include defining any one or any combination of any two or more of a size, a material, a shape, and a property of the particle in the second state.

The method may further include maintaining constant a memory size occupied by particles in the second state.

The method may further include displaying the object based on the particles.

In another general aspect, a non-transitory computer-readable medium stores instructions to cause computing hardware to perform the method described above.

In another general aspect, a method of modeling an object includes classifying states of a plurality of particles forming a fluid into a first state, a second state, and a third state, the first state not being represented in a virtual space and the second state and the third state being represented in the virtual space; applying a movement model to particles in the second state and particles in the third state; and representing the fluid in the virtual space based on the particles in the second state and the particles in the third state to which the movement model has been applied.

The method may further include maintaining constant a memory size occupied by the particles in the second state.

The method may further include dynamically maintaining a memory size occupied by particles in the first state.

The method may further include dynamically maintaining a memory size occupied by the particles in the third state.

The method may further include maintaining constant a sum of a memory size occupied by particles in the first state and a memory size occupied by the particles in the third state.

The method may further include maintaining constant a sum of a memory size occupied by particles in the first state, a memory size occupied by the particles in the second state, and a memory size occupied by the particles in the third state.

The method may further include maintaining constant a number of particles in the first state.

The method may further include maintaining constant a sum of a number of particles in the first state, a number of the particles in the second state, and a number of the particles in the third state.

The second state may be a state corresponding to a representative flow of the fluid.

The third state may be a state corresponding to a subordinate flow of the fluid.

In another general aspect, a method of modeling an object includes moving particles defining an object according to a movement model; and changing a state of some of the moved particles according to a state transition probability.

The method may further include selecting particles from a pool of particles in a first state; changing a state of the selected particles from the first state to a second state; and defining the object using the particles changed to be in the second state.

The changing of a state of some of the moved particles may include changing a state of some of the moved particles from the second state to a third state according to a first state transition probability, and changing a state of some of the moved particles from the second state to the first state according to a second state transition probability.

The method may further include repeating the moving of the particles defining the object and the changing of a state of some of the moved particles at predetermined intervals to simulate a change in a configuration of the object over a period of time.

The changing of a state of some of the moved particles may further include changing a state of some of the moved particles from the third state to the first state according to a third state transition probability.

The method further include adjusting any one or any combination of any two or more of the first state transition probability, the second state transition probability, and the third state transition probability to maintain a number of particles in the second state constant.

The method may further include comparing a number of particles in the first state remaining in the pool to a threshold each time the changing of a state of some of the moved particles is performed; and adjusting any one or any combination of any two or more of the first state transition probability, the second state transition probability, and the third state transition probability based on a result of the comparing.

The adjusting may include adjusting any one or any combination of any two or more of the first state transition probability to decrease a probability that the state of a particle in the second state will change to the third state, the second state transition probability to increase a probability that the state of a particle in the second state will change to the first state, and the third state transition probability to increase a probability that the state of a particle in the third state will change to the first state in response to the number of particles in the first state remaining in the pool being less than the threshold; and adjusting either one or both of the first state transition ability to increase the probability that the state of a particle in the second state will change to the third state, the second state transition probability to increase the probability that the state of a particle in the second state will change to the first state, and the third state transition probability to decrease the probability that the state of a particle in the third state will change to the first state in response to the number of particles in the first state remaining in the pool being greater than or equal to the threshold.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements, The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, steps, operations, elements, components, and/or combinations thereof.

Unless otherwise defined, all terms including, technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
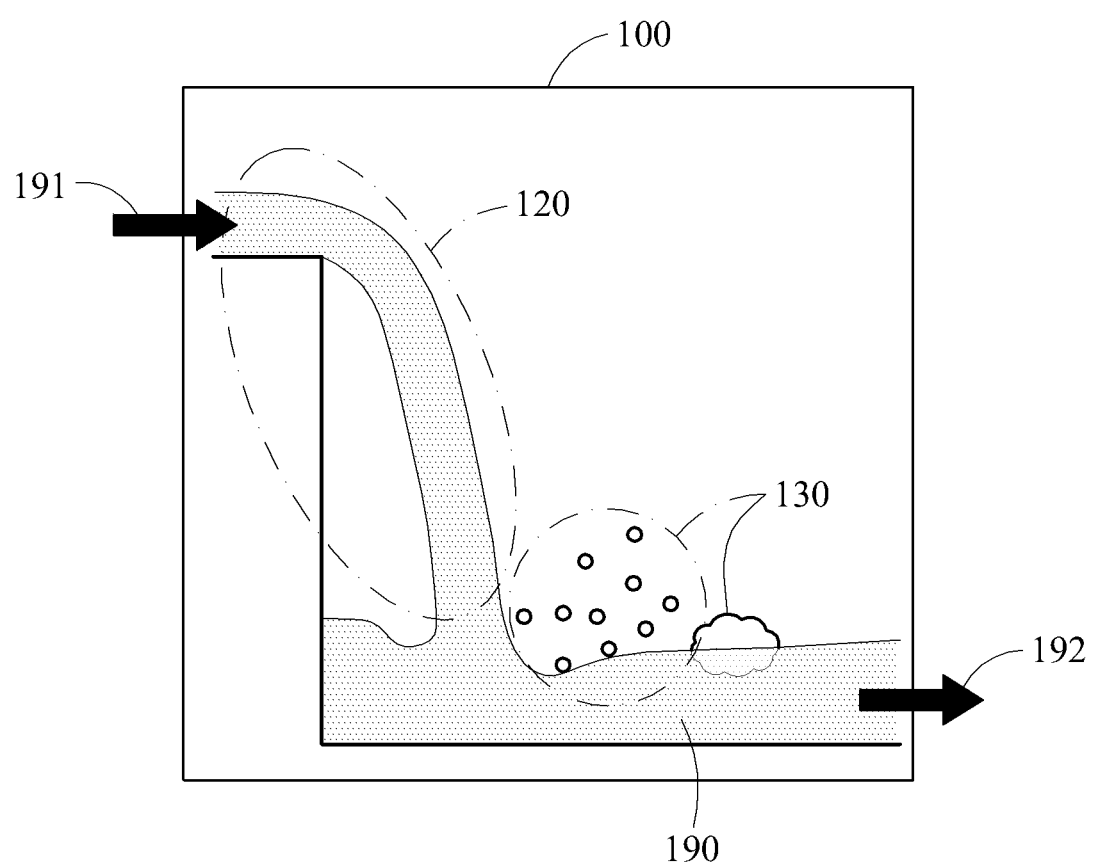
FIG. 1 illustrates an example of a displayed object.

FIG. 1 illustrates an example of a displayed object.

A display 100 of an apparatus for modeling an object visually represents an object 190. For example, the display 100 performs modeling of the object 190 in a two-dimensional (2D) form or a three-dimensional (3D) form, and displays the object 190 in a scene.

A scene includes at least one frame representing the object 190 and a virtual space in which the object 190 is located. A plurality of frames are used to form a moving image. The virtual space represents a 2D space or 3D space in which the object 190 exists.

The object 190 my be, for example, an inanimate object, a fluid, gas, a solid, a rigid body, a soft body, or a deformable object. The deformable object is, for example, an object including both a rigid body and a soft body. For example, a position, a shape, a size, and a state of each of particles change based on an arbitrary movement model in a scene or a virtual space. Hereinafter, an example of modeling of the object 190 when the object 190 is a fluid will be described.

A movement model is a model defining a movement of an object and each of particles forming the object. For example, when an object is a fluid, a movement model is obtained by numerically defining a flow of the fluid. The movement model is defined so that a position and a velocity of each of particles included in the fluid are determined by time integration of the velocity and an acceleration of each of the particles. For example, the acceleration is determined by the laws of physics, for example, an acceleration due to gravity.

In one example, when an object is a fluid, a movement model includes the Navier-Stokes equation. The Navier-Stokes equation treats the fluid as a sum of extremely small particles, and expresses how the particles move while interacting with each other. To realistically reproduce fluid modeling based on the Navier-Stokes equation, an incompressible condition needs to be satisfied. When a relatively ideal situation is assumed, the Navier-Stokes equation may be replaced by the Bernoulli equation, which is simpler than the Navier-Stokes equation.

When the object 190 is a fluid, an inlet 191 through which particles forming the fluid flow in, and an outlet 192 through which the particles flowing in the virtual space are discharged, are defined as illustrated in FIG. 1. FIG. 1 illustrates an example in which water is running in a sink. Particles in the virtual space are defined to have a single state. For example, a state of each of particles is defined as a first state, a second state 120, and a third state 130, but the states are not limited thereto. Accordingly, a definition and a number of states of particles may be changed depending on a design of the modeling.

The first state is a state in which particles are not used in the virtual space, and includes, for example, a state in which particles are temporarily located in a memory after representation of the particles in a scene on the display 100 is terminated. The first state is a state in which particles are not represented in the virtual space. For example, particles transition from the second state 120 or the third state 130 to the first state. The first state is referred to as a remaining state.

The second state 120 is a state in which particles represent a representative flow of the fluid in the virtual space, and includes, for example, a state in which particles flow in through the inlet 191, and a state in which particles represent a representative fluid flow in a scene. The second state 120 is referred to as a primary flow state. When a state of a particle is changed from the first state to the second state 120 in a frame, a position and a velocity of the particle changed to be in the second state 120 are set as an initial position corresponding to a position of the inlet 191 at a point in time immediately after the particle flows through the inlet 191, and an initial velocity at which the particle flows in, respectively.

The third state 130 is a state to which particles representing the representative flow of the fluid in the virtual space transition, and indicates a state that is changed from the second state, and in which particles represent a subordinate flow of the fluid. The third state 130 includes, for example, a splash state, a state in which water drops flow along a surface of another object, and a foamy state. The third state 130 is referred to as a secondary flow state.

Because a flow of a fluid is represented based on a limited number of particles to perform modeling of an object, the particles are not dynamically generated and destroyed. Thus, a calculation speed is increased, and a relatively low calculation ability is needed. Also, an apparatus for modeling an object efficiently uses a memory space by maintaining a proper number of particles in the remaining state. Hereinafter, a scheme of efficiently reusing particles to represent a fluid flow based on a limited number of particles will be described.

Figure 2:
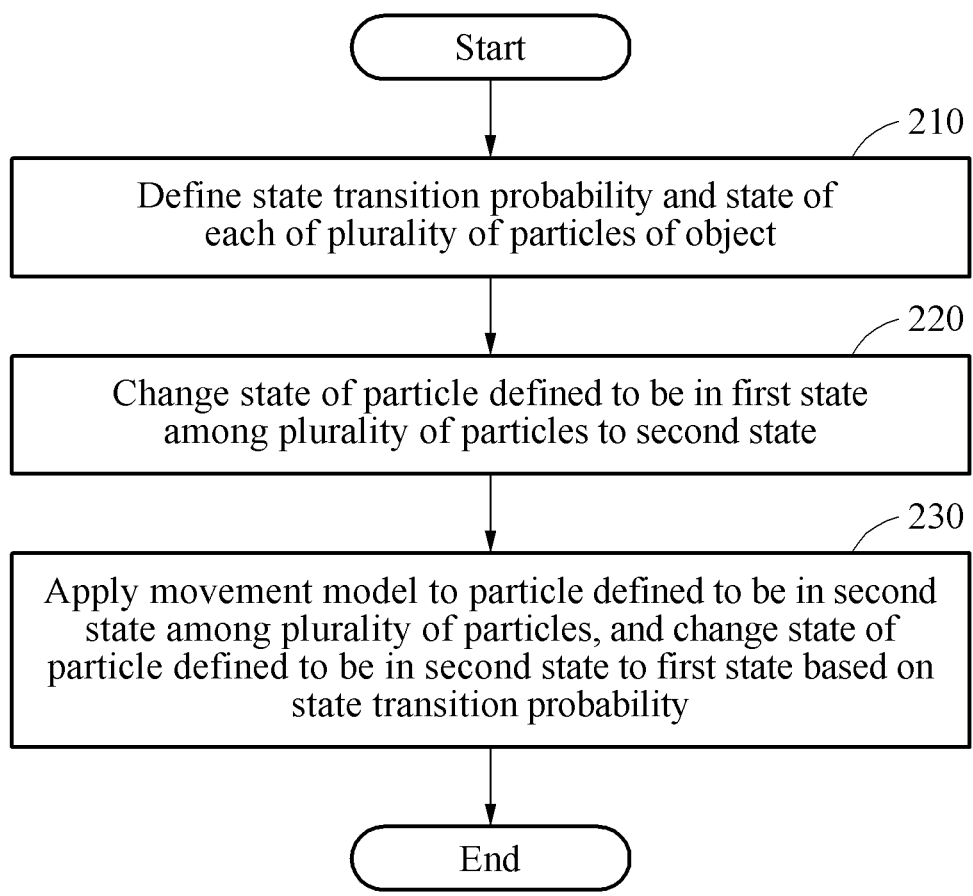
FIGS. 2 and 3 illustrate examples of a method of modeling an object.
Figure 3:
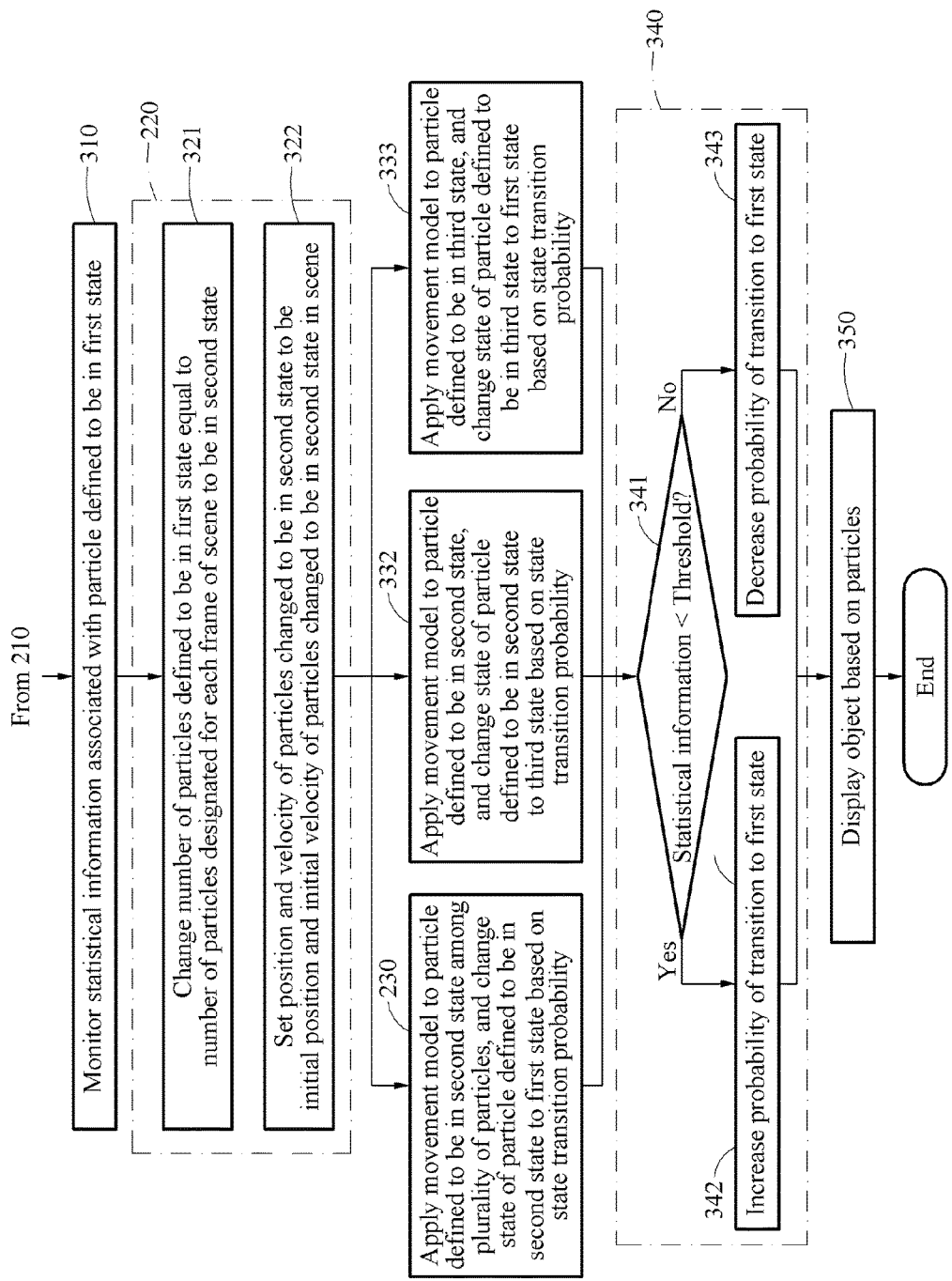

FIGS. 2 and 3 illustrate examples of a method of modeling an object.

FIG. 2 illustrates a method of modeling an object in a predetermined frame.

Referring to FIG. 2, in operation 210, a processor included in an apparatus for modeling an object defines a state transition probability and a state of each of a plurality of particles forming the object. The processor defines a state of each of the plurality of particles to be, for example, one of a first state, a second state and a third state. For example, the processor classifies states of a plurality of particles forming a fluid into a first state, a second state and a third state. In this example, in the first state, the particles are not represented in a virtual space, and in the second state and the third state, the particles are represented in the virtual space. Also, the processor defines a state transition probability of a transition of each of the plurality of particles from a current state to another state. The state transition probability is a probability that a particle will transition from a current state of the particle to another state, and includes, for example, a probability of a transition from the second state to the first state or the third state, or a probability of a transition from the third state to the first state.

In operation 220, the processor changes a state of a particle defined to be in the first state among the plurality of particles to the second state. For example, the processor changes, to be in the second state, a number of particles defined to be in the first state equal to a number of particles designated for each frame of a scene. While changing the particle defined to be in the first state to be in the second state, the processor sets a position of the particle in the second state as an initial position at which a fluid flow starts, and sets a velocity of the particle in the second state as an initial velocity of the fluid flow. Thus, the processor may reuse at least one of the particles defined to be in the first state to represent the fluid flow.

In operation 230, the processor applies a movement model to a particle defined to be in the second state among the plurality of particles, and changes a state of the particle defined to be in the second state to the first state based on the state transition probability. For example, the processor changes a position and a velocity of the particle defined to be in the second state by applying the movement model to the particle defined to be in the second state. Also, the processor determines whether a state of a particle transitions to another state based on the state transition probability.

Hereinafter, the method of FIG. 2 is further described with reference to FIG. 3.

Referring to FIG. 3, in operation 310, the processor monitors statistical information associated with the particle defined to be in the first state. Also, the processor monitors statistical information associated with a particle defined to be in the second state and a particle defined to be in the third state. Statistical information associated with particles defined to be in a predetermined state (for example, the first state, the second state, or the third state) includes, for example, a number of the particles, a memory size occupied by the particles, and a ratio of the particles in one state to particles in another state. However, the statistical information is not limited thereto, and a variety of statistical data may be used depending on a design of the modeling. Also, the processor monitors a memory size occupied by the particle defined to be in the first state.

As described above, in operation 220 of FIG. 2, the processor changes the state of the particle defined to be in the first state to the second state. In operation 321, the processor changes, to be in the second state, a number of particles defined to be in the first state equal to a number of particles designated for each frame of a scene. For example, the processor determines a number of particles that need to transition from the first state to the second state based on an area of an inlet and a velocity of a fluid. In operation 322, the processor sets a position and velocity of the particles changed to be in the second state to be an initial position and an initial velocity of the particles changed to be in the second state in the scene.

In operations 230, 332, and 333, the processor applies the movement model to particles having defined states, and changes the states of the particles to another state based on the state transition probability.

As described above, in operation 230, the processor applies the movement model to the particle defined to be in the second state, and changes the state of the particle defined to be in the second state to the first state based on the state transition probability.

In operation 332, the processor applies the movement model to the particle defined to be in the second state, and changes the state of the particle defined to be in the second state to a third state based on the state transition probability. When a predetermined event occurs in a particle in a primary flow state, the processor determines whether the primary flow state is to be changed to a secondary flow state based on the state transition probability. An example of the event is described with reference to FIG. 6. The primary flow state is, for example, the second state, and the secondary flow state is, for example, the third state.

In operation 333, the processor applies the movement model to a particle defined to be in the third state, and changes a state of the particle defined to be in the third state to the first state based on the state transition probability. When a predetermined event occurs in a particle in the secondary flow state, the processor determines whether the secondary flow state is to be changed to a remaining state. As described above, the remaining state is, for example, the first state, and the secondary flow state is, for example, the third state.

In operation 340, the processor adjusts the state transition probability based on the statistical information associated with the particle defined to be in the first state. The processor determines the state transition probability based on the memory size occupied by the particle defined to be in the first state monitored in operation 310. For example, the processor defines a predetermined number of states (for example, three states) of particles, and dynamically recalculates a state transition probability between the states, and thus it is possible to efficiently reuse particles to generate an object.

In operation 341, the processor compares the statistical information to a preset threshold. The processor determines the state transition probability based on a result of the comparing. In operation 342, the processor increases a probability of a transition to the first state in response to the statistical information being less than the threshold. In operation 343, the processor decreases the probability of the transition to the first state in response to the statistical information being equal to or greater than the threshold. For example, in operation 343, the processor may decrease the probability of the transition to the first state to a default value. The threshold includes, for example, a number of the particles or a ratio between the particles, and is set by a user depending on a design of the modeling or is acquired by a simulation.

The processor determines whether a number of particles in the first state, that is, the remaining state, is insufficient based on the number of the particles in the first state or a ratio of the number of the particles in the first state to a total number of all particles in all states. For example, when the number of the particles in the first state is lower than a threshold, the processor determines that the number of the particles in the first state is insufficient. When the number of the particles in the first state is determined to be insufficient, the processor increases a number of particles in the first state by adjusting the state transition probability. For example, the processor increases the probability of the transition to the first state as described in operation 342, or decreases a probability of a transition from the second state to the third state.

The processor increases a number of particles in the first state by adjusting the state transition probability in operation 340 as described above, and accordingly it is possible to stably generate a representative fluid flow (for example, a set of particles in the second state). In one example, when the number of the particles in the first state is determined to be insufficient, the processor decreases a probability of a transition from the second state to the third state so that fewer particles transition from the second state to the third state and more particles remain in the second state. The third state is, for example, the secondary flow state indicating a subordinate flow of a fluid, and the second state is, for example, the primary flow state indicating a representative flow of the fluid. Accordingly, the processor dynamically adjusts the state transition probability while monitoring statistical information of particles for each frame. Thus, an apparatus may stably represent a primary flow even though the total number of particles is not sufficient to represent a whole fluid flow including the primary flow and the secondary flow. Therefore, it is possible to reduce a memory size, and to minimize a number of particles to be processed to enable calculation to be performed at a higher speed.

In operation 350, the processor displays the object based on the particles. The processor represents the fluid in the virtual space based on particles that are in the second state and the third state and to which the movement model is applied. For example, the processor controls a display to display the particles in the second state and the particles in the third state for each frame. Also, the processor defines any one or any combination of any two or more of a size, a material, a shape, and a property of each of the particles. The processor defines, for example, a size, a material, a shape, and a property of a particle in the second state and a particle in the third state, and visually represents the particles based on the defined size, the defined material, the defined shape, and the defined property. The material is used to determine a texture to represent a particle. The property is used to determine physical properties (for example, a surface tension coefficient) of a particle in the movement model.

Figure 4:
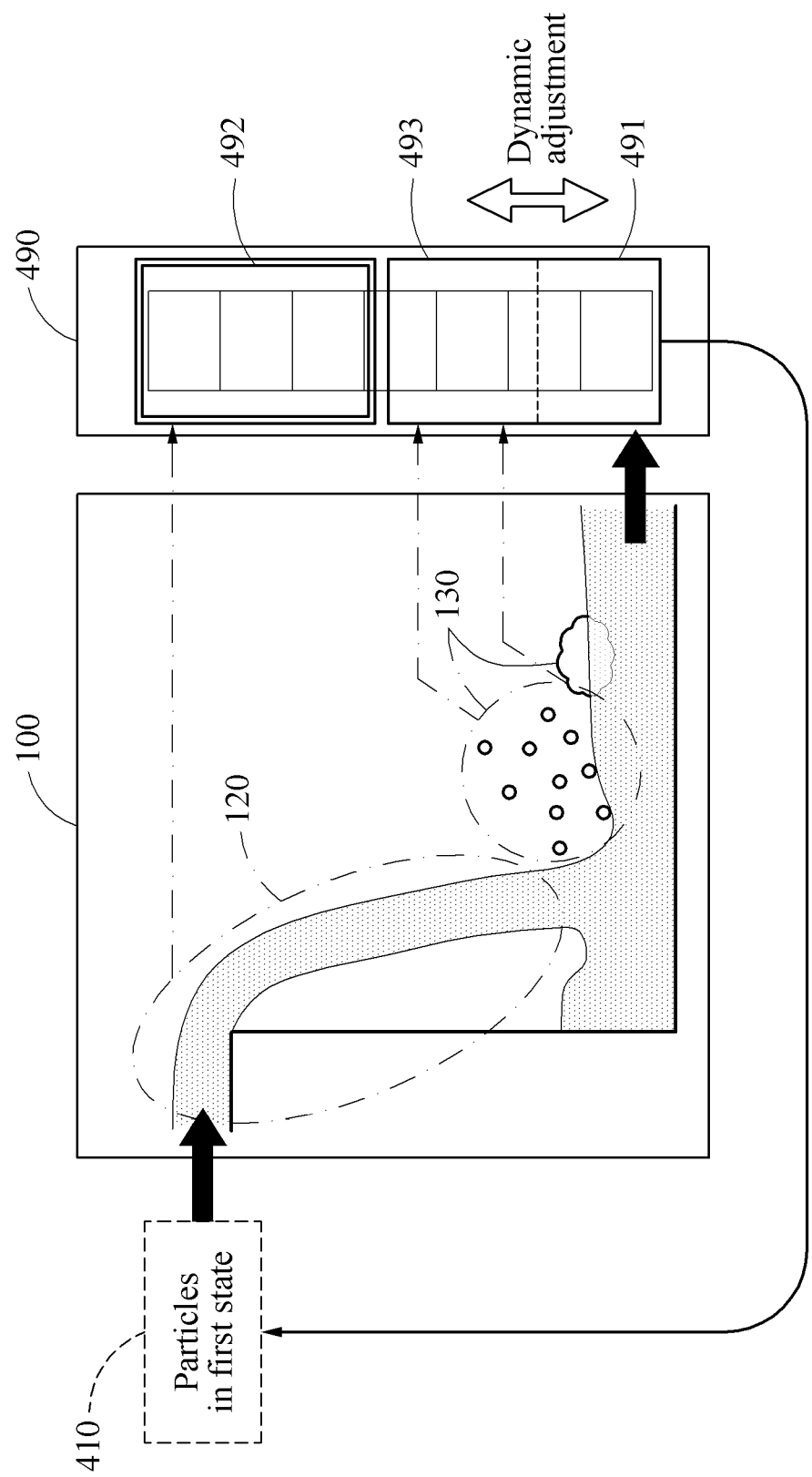
FIG. 4 illustrates an example of modeling an object.

FIG. 4 illustrates an example of modeling an object.

A display 100 of FIG. 4 represents the same scene as the scene of FIG. 1. For example, the display 100 represents a scene of a predetermined frame.

A memory 490 stores a particle 410 in a first state, a particle in a second state 120 and a particle in a third state 130. The particle 410 is not displayed on the display 100, and the particle in the second state 120 and the particle in the third state 130 are displayed on the display 100. As described above with reference to operation 220 of FIG. 3, a processor changes a state of the particle 410 to a second state, and sets a position of the particle 410 to be an initial position corresponding to a position of an inlet. For example, the processor changes a state of each of particles 410 in the first state to the second state, and performs initialization. In this example, a number of the particles 410 is designated for each frame.

In one example, the memory 490 generates and maintains particles based on a predetermined size of the memory 490. In other words, a number of the particles is determined based on the size of the memory 490. The processor classifies states of the particles and uses the particles to represent an object. For example, the processor maintains constant a memory size 492 occupied by particles in the second state 120, and dynamically adjusts a memory size 491 occupied by particles 410 in the first state and a memory size 493 occupied by particles in the third state 130. All frames have the same memory size allocated to all particles, for example, the particles 410, the particles in the second state 120, and the particles in the third state 130.

In another example, the memory 490 dynamically maintains a memory size occupied by particles in the first state and a memory size occupied by particles in the third state. In this example, the memory 490 maintains constant a memory size occupied by the particles in the first state and particles in the third state. Also, the memory 490 maintains constant a sum of a memory size occupied by the particles in the first state, a memory size occupied by particles in the second state, and a memory size occupied by the particles in the third state.

In still another example, the memory 490 maintains constant a number of particles in the first state. Also, the memory 490 maintains constant a sum of the number of the particles in the first state, a number of particles in the second state, and a number of particles in the third state.

The processor maintains the memory size 492. The processor dynamically adjusts the memory sizes 491 and 493 by adjusting the state transition probability as described above with reference to operation 340 of FIG. 3. For example, the processor maintains a visual quality of a fluid flow represented by the particles in the second state 120 by maintaining the memory size 492 occupied by the particles in the second state 120.

Figure 5:
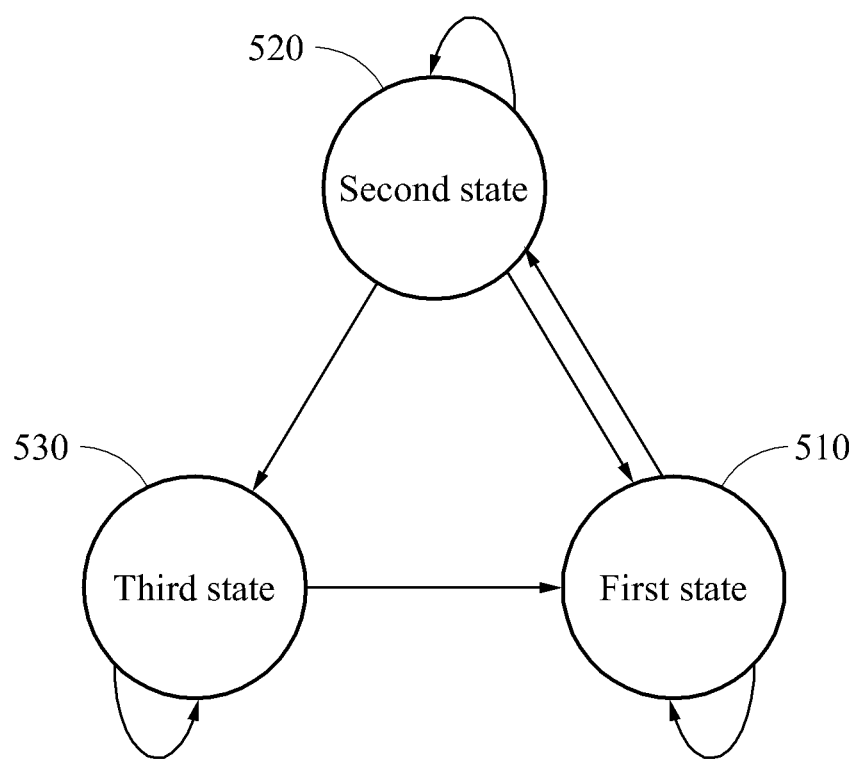
FIG. 5 illustrates an example of a transition of a state of an object.

FIG. 5 illustrates an example of a transition of a state of an object.

In this application, a state of a particle is defined to be one of a first state 510, a second state 520, and a third state 530. As described above, the first state 510 is a state of a particle that is not used in a display in a corresponding frame, and is referred to as a remaining state. The second state 520 is a state of a particle used to represent a representative fluid flow in a corresponding frame, and is referred to as a primary flow state. The third state 530 is a state of a particle used to represent a subordinate fluid flow in a corresponding frame, and is referred to as a secondary flow state. However, the states of the particle are not limited thereto, and may vary depending on a design of the modeling.

IA processor changes a state of a particle in the first state 510, for example, the remaining state, to the second state 520. The processor changes a number of particles in the first state 510 corresponding to a number of particles required in each frame among particles in the first state 510 to be in the second state 520, while maintaining the other particles in the first state 510. The particles in the first state 510 are stored and maintained in a memory until the processor retrieves them if necessary, and are not displayed on a display. Also, a state of a particle in the first state 510 is not changed to the third state 530.

The processor applies a movement model to a particle in the second state 520, for example, the primary flow state. When a predetermined event occurs in the particle in the second state 520, the processor changes a state of the particle in the second state 520 to the third state 530 or the first state 510 based on a state transition probability. When the event does not occur in the particle in the second state 520, the processor maintains the particle in the second state 520.

The processor applies a movement model to a particle in the third state 530, for example, the secondary flow state. When a predetermined event occurs in the particle in the third state 530, the processor changes a state of the particle in the third state 530 to the first state 510 based on the state transition probability. When the event does not occur in the particle in the third state 530, the processor maintains the particle in the third state 530. The state of the particle in the third state 530 is not changed to the second state 520.

Figure 6:
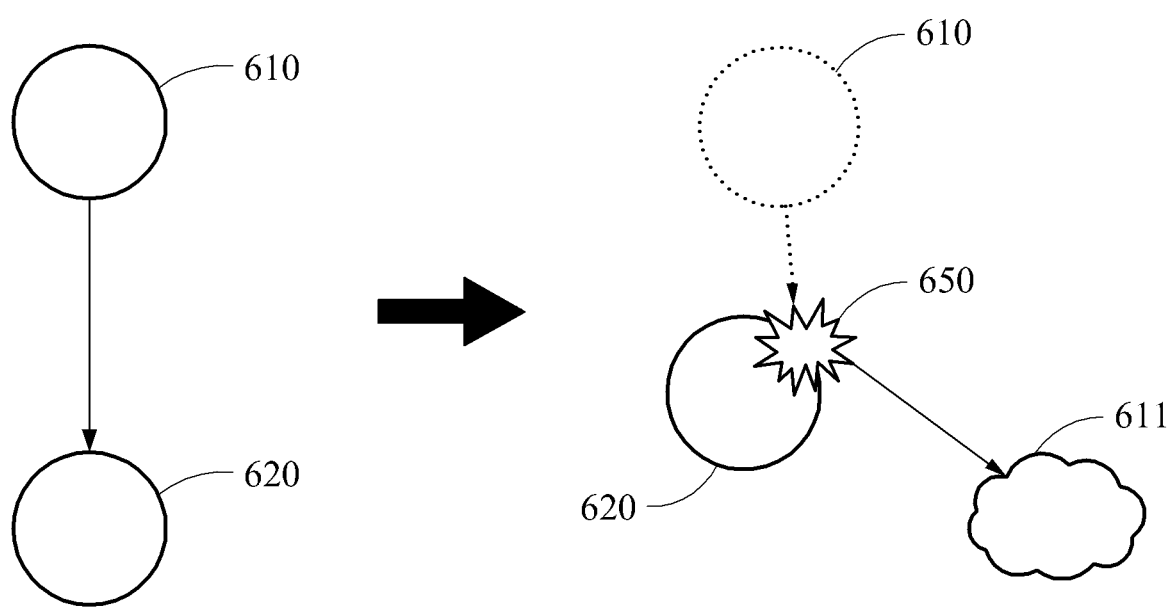
FIG. 6 illustrates an example in which a state of an object transitions.

FIG. 6 illustrates an example in which a state of an object transitions.

A processor applies a movement model to particles in a second state and particles in a third state, and determines whether a state of a particle in which a predetermined event occurs is to be changed to another state based on a state transition probability. FIG. 6 illustrates an example of a predetermined event, that is, a collision between two particles.

When the processor applies a movement model to an arbitrary particle 610, the particle 610 approaches another particle 620. When a distance between the particles 610 and 620 is less than a preset threshold distance or when the particles 610 and 620 come in contact with each other, an interaction 650 (for example, a collision) between the particles 610 and 620 occurs. For example, when the particles 610 and 620 are in contact with each other, the processor determines that the particles 610 and 620 have collided with each other.

In response to an interaction occurring between a particle changed to be in the second state and a particle of another object, the processor changes a state of the particle changed to be in the second state to the third state based on the state transition probability. In FIG. 6, the processor changes the particle 610 colliding with the particle 620 to a particle 611 in another state (for example, a state of a droplet).

However, in this application, the event is not limited to the interaction 650, and may be, for example, an event in which the particle 610 reaches a predetermined position in a scene, or an event in which a predetermined amount of time has elapsed after the particle 610 is generated. Also, the interaction 650 is not limited to a collision between two particles, but may be any interaction between two particles, for example, an attractive force and a tension.

Figure 7:
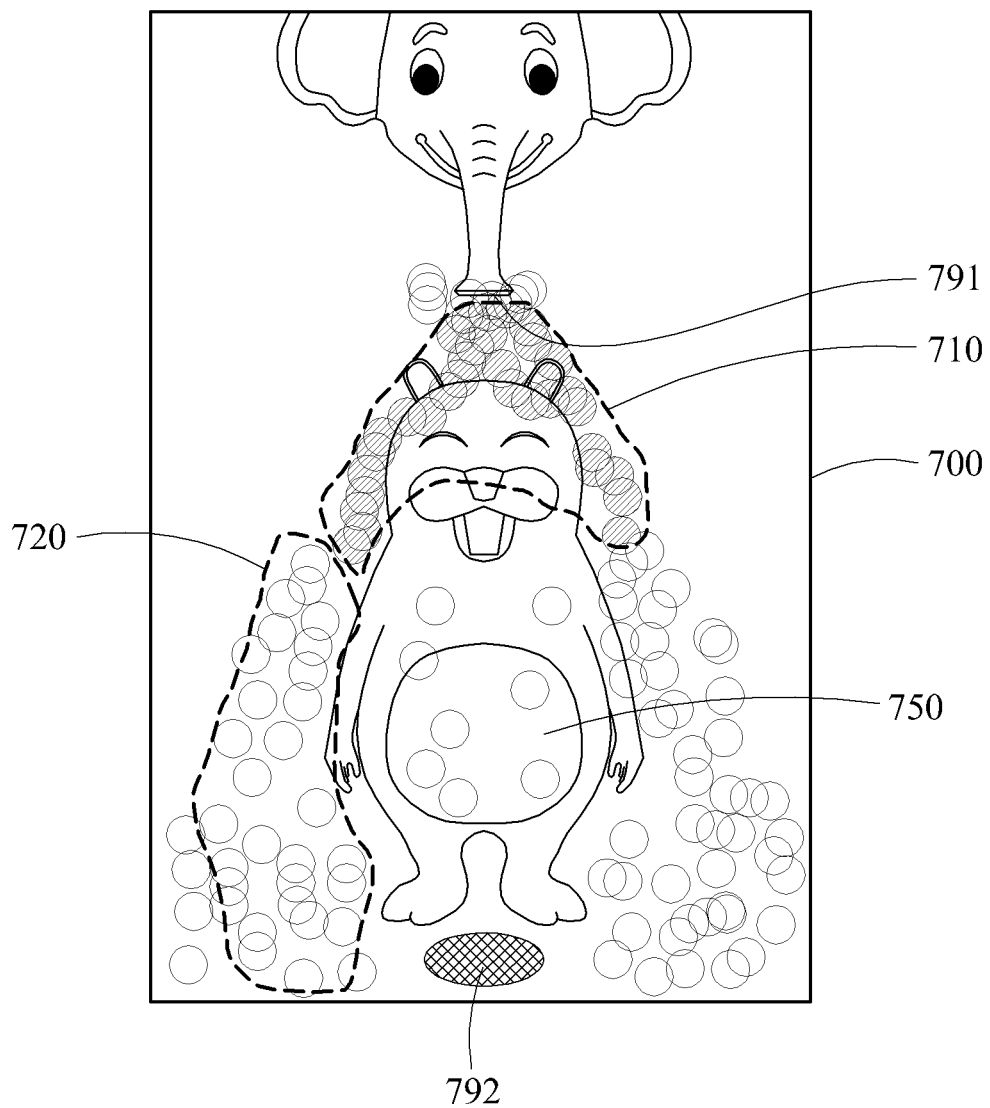
FIG. 7 illustrates another example of modeling an object.

FIG. 7 illustrates another example of modeling an object.

Referring to FIG. 7, a display 700 represents a virtual space in which a separate object 750 exists and in which a fluid flows in and out. In FIG. 7, a processor performs processing so that particles forming the fluid flow in through an inlet 791 and flow out through an outlet 792. Also, the processor defines a state of inflowing particles to be a second state, that is, a primary flow state, for example, a stream of water in FIG. 7. The processor applies a movement model to particles 710 defined to be in the second state, and processes each of the particles 710 to move downwardly based on gravity. In addition, the processor changes the state of the particles 710 that is are contact with the object 750 to a third state, that is, a secondary flow state, for example, bubbles in FIG. 7, based on the state transition probability.

Also, each of the particles of FIG. 7 is set to have a shape of a circle or a sphere having a predetermined size and color tone, but the shape is not limited thereto. Accordingly, a size, a material, a shape, and a property of a particle may be changed depending on a design of the modeling.

The flow of the fluid shown in FIG. 7 is merely an example, and accordingly an apparatus for modeling an object may process and display particles forming other types of objects.

Figure 8:
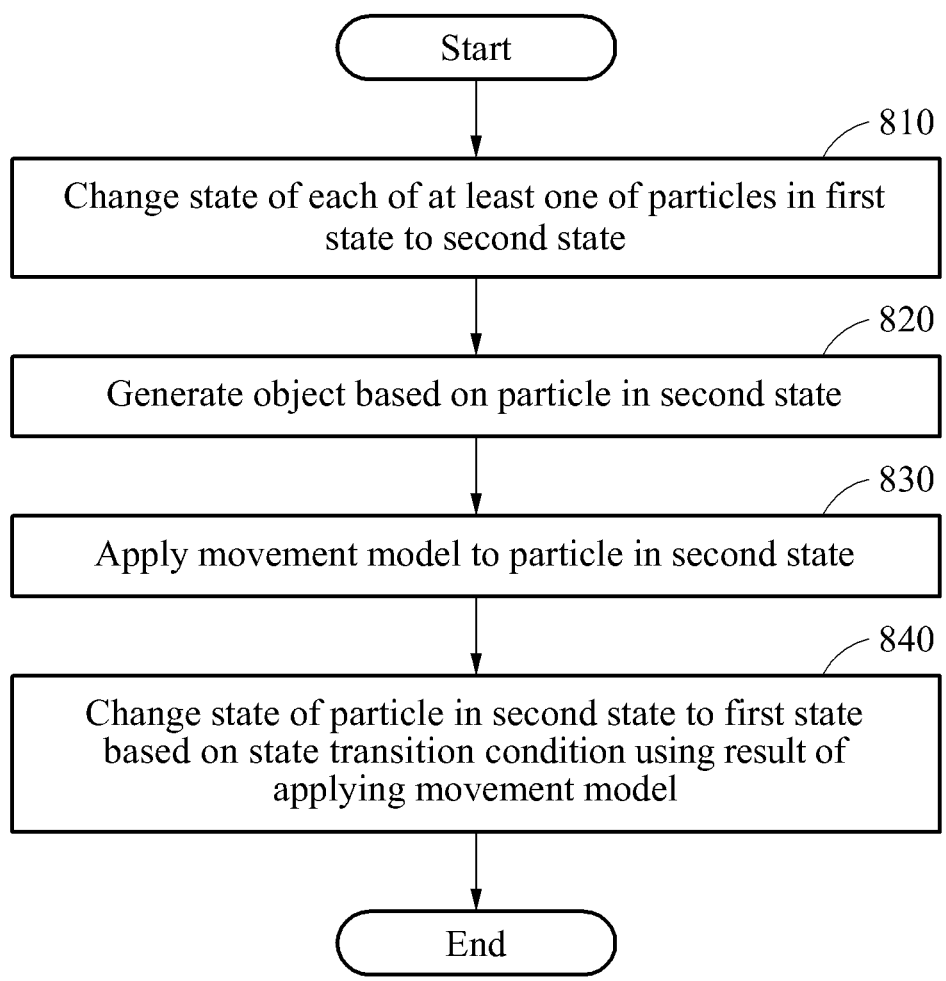
FIG. 8 illustrates another example of a method of modeling an object.

FIG. 8 illustrates another example of a method of modeling an object.

FIG. 8 illustrates an example of processing particles forming an object until the particles flowing in a virtual space are discharged (for example, during a cycle of generation to destruction of the particles).

Referring to FIG. 8, in operation 810, a processor changes a state of at least one of particles in a first state to a second state. For example, the processor changes, to be in the second state, a number of particles defined to be in the first state equal a number of particles designated for each frame of a scene. Also, the processor applies a movement model to a particle changed to be in the second state. The processor defines any one or any combination of any two or more of a size, a material, a shape, and a property of a particle in the second state.

In operation 820, the processor generates an object based on the particle in the second state. However, this is merely an example. When particles in states other than the first state exist, the processor generates the object based on the particles in the other states. For example, the processor generates the object based on a particle in the second state and a particle in a third state.

In operation 830, the processor applies a movement model to the particle in the second state. However, this is merely an example, and accordingly the processor applies the movement model to particles in states (for example, the third state) other than the first state.

In operation 840, the processor changes a state of the particle in the second state to the first state based on a state transition condition using a result of applying the movement model. The state transition condition is a condition that a state of a particle changes to another state, and includes a condition that the second state changes to the third state or the first state, and a condition that the third state changes to the first state. The state transition condition includes, for example, a condition that whether a state transitions is determined based on a state transition probability in response to an occurrence of a predetermined event as described above with reference to FIG. 6, and a condition that a state of a particle changes when the particle reaches a predetermined position in a virtual space. However, the state transition condition is not limited to the conditions described above, and may be changed depending on a design of the modeling. An example of the condition that a state of a particle changes when the particle reaches a predetermined position in a virtual space will be described with reference to FIG. 9.

In one example, in response to a particle in the second state reaching a predetermined space in a scene, the processor changes a state of the particle from the second state to another state, for example, the first state or the third state. In another example, in response to the particle in the second state interacting with another object, the processor changes the state of the particle in the second state to another state, for example, the first state or the third state, based on the state transition probability.

Figure 9:
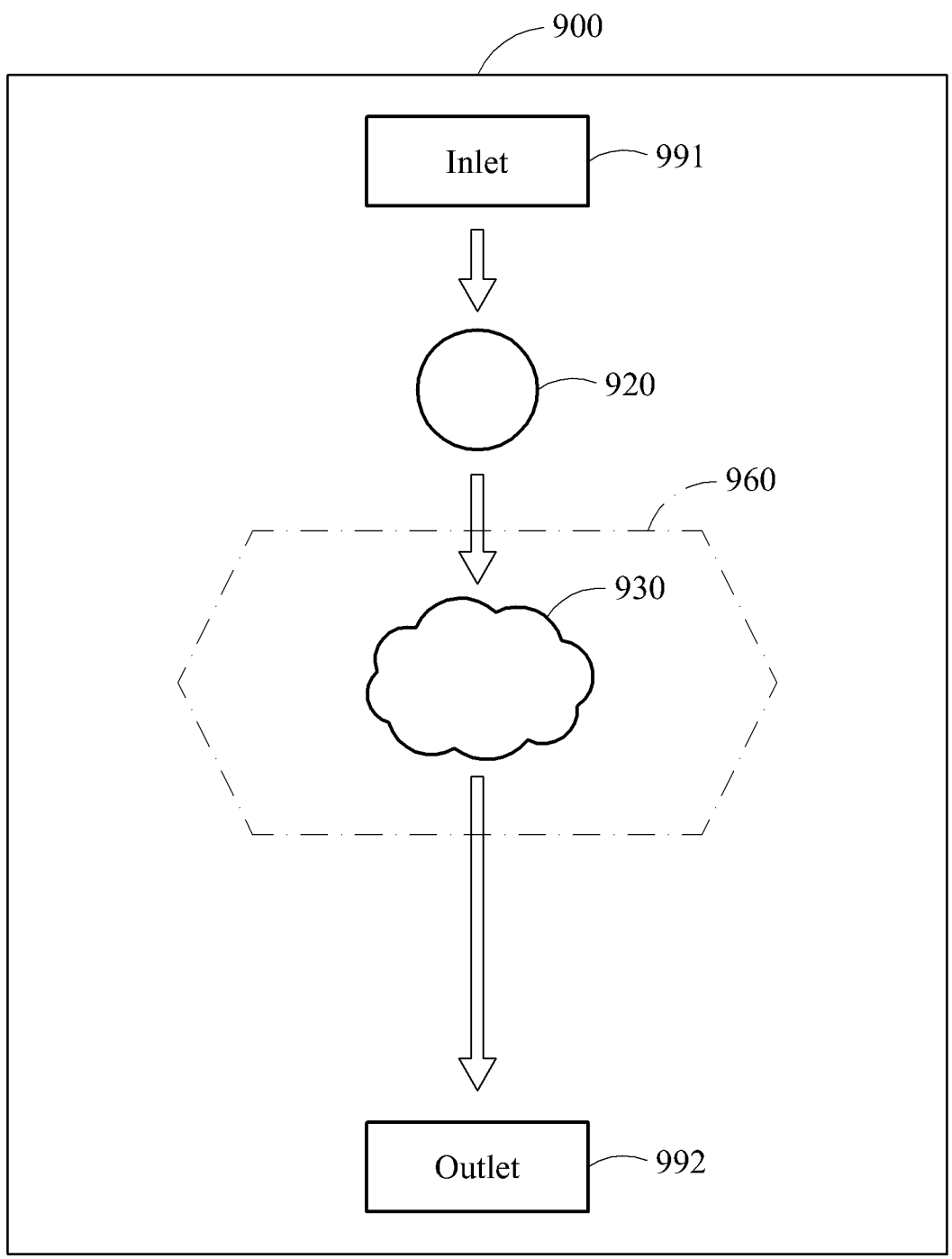
FIG. 9 illustrates another example in which a state of an object transitions.

FIG. 9 illustrates another example in which a state of an object transitions.

Referring to FIG. 9, a display 900 represents a virtual space that includes an inlet 991 and an outlet 992 and in which an object is moving based on a movement model.

In response to a particle 920 in a second state reaching a space 960 in a scene, a processor changes a state of the particle 920 to another state. For example, when the particle 920 in the second state reaches the space 960, the processor changes the particle 920 to a particle 930 in a third state. The space 960 is set as a space (for example, an outline of the scene) with a low need to be visually represented in a virtual space. However, the space 960 is not limited to this example. For example, when the particle 920 reaches a space corresponding to the outlet 992, the processor changes the state of the particle 920 to the first state. When the particle 920 disappears from the scene, the processor also changes the state of the particle 920 to the first state.

Figure 10:
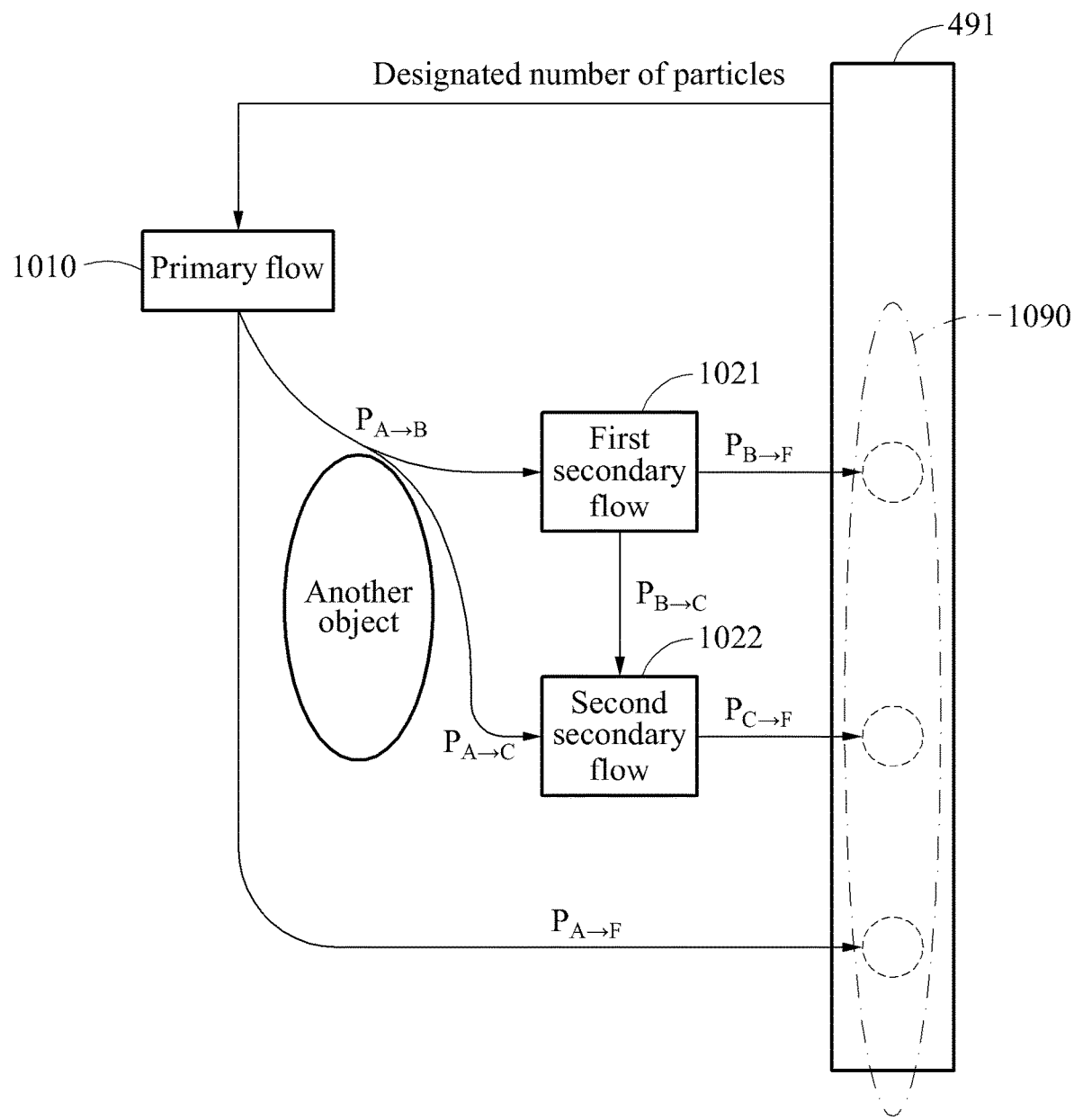
FIG. 10 illustrates an example of a transition of a state of an object over time.

FIG. 10 illustrates an example of a transition of a state of an object over time.

An example of a condition of a change in a state of a particle based on a state transition probability upon an occurrence of a predetermined event among state transition conditions is described based on a cycle of a particle with reference to FIG. 10. In this example, the cycle of the particle corresponds to an amount of time in which the particle flows into a virtual space and is discharged from the virtual space, is stored in a memory to be in a remaining state, and flows into the virtual space again.

A processor sets an arbitrary particle to be in a second state, for example, a primary flow state 1010. The processor initializes a position and a velocity of the particle in the primary flow state 1010.

The processor changes the particle in the primary flow state 1010 to a particle in a remaining state 1090 based on a probability $P_{A \to F}$. When the particle in the primary flow state 1010 interacts with another object, the processor changes the particle in the primary flow state 1010 to be in a first secondary flow state 1021 based on a probability $P_{A \to B}$. When particles in the primary flow state 1010 interact with each other, the processor changes the particles in the primary flow state 1010 to be in a second secondary flow state 1022 based on a probability $P_{A \to C}$.

The processor changes a particle in the first secondary flow state 1021 to a particle in the remaining state 1090 based on a probability $P_{B \to F}$. Also, the processor changes the particle in the first secondary flow state 1021 to be in the second secondary flow state 1022 based on a probability $P_{B \to C}$. In addition, the processor changes a particle in the second secondary flow state 1022 to a particle in the remaining state 1090 based on a probability $P_{C \to F}$.

The processor changes, to be in the primary flow state 1010, changes a number particles in the remaining state 1090 equal to a number of particles designated for each frame to be in the primary flow state 1010.

Figure 11:
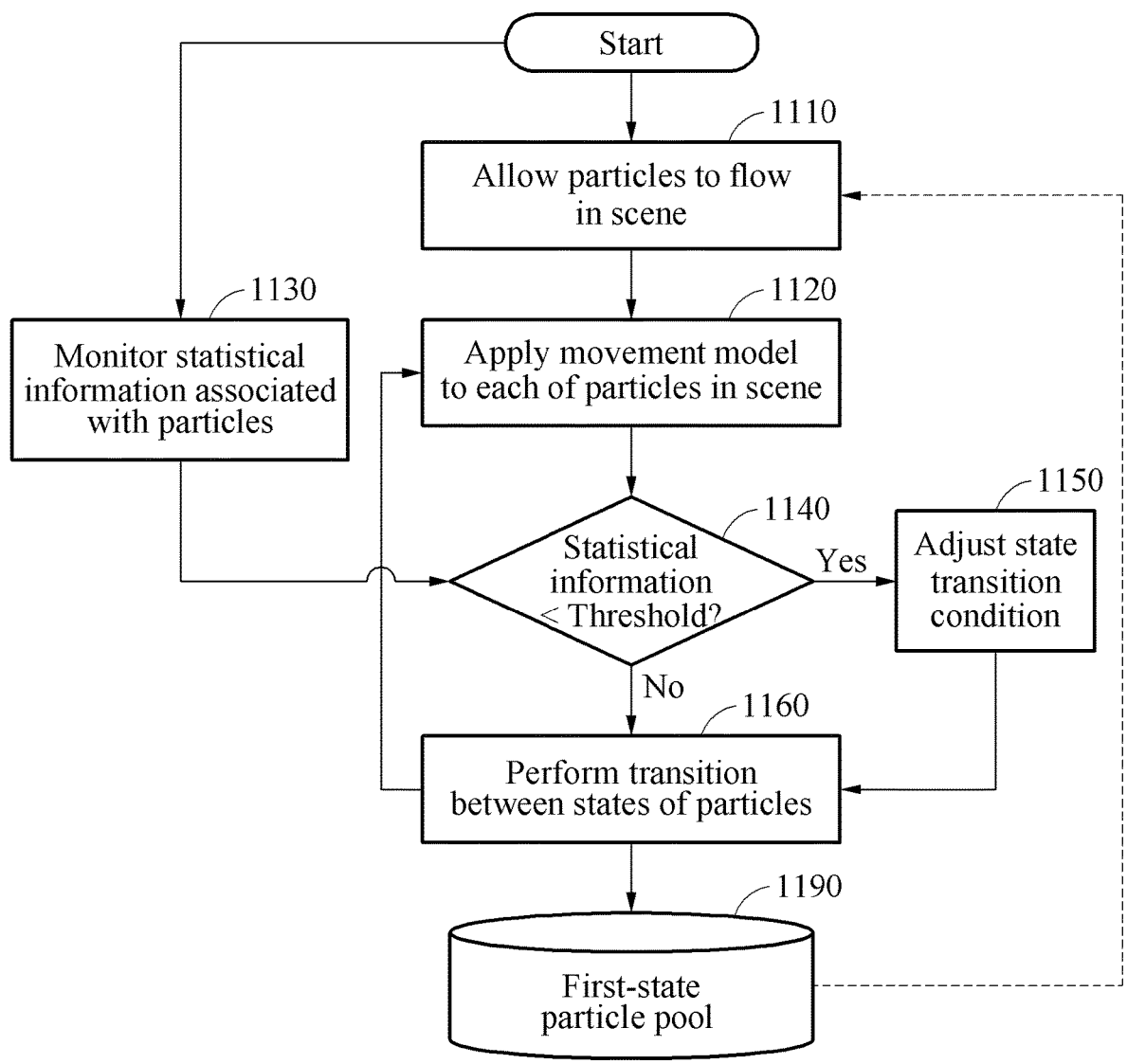
FIG. 11 illustrates an example of a scheme of adjusting a state transition condition based on statistical information.

FIG. 11 illustrates an example of a scheme of adjusting a state transition condition based on statistical information.

Referring to FIG. 11, in operation 1110, the processor allows particles to flow in a scene. For example, the processor changes a designated number of particles among particles in the first state to be in a second state, and initializes a position and a velocity of the particles designated to be in the second state.

In operation 1120, the processor applies a movement model to each of particles. For example, the processor applies the movement model to each of a particle in the second state and a particle in a third state, and changes a position and a velocity of the particles to which the movement model is applied. Because a particle in the first state is not represented in a scene, the processor does not apply the movement model to the particle in the first state.

In operation 1130, the processor monitors statistical information associated with the particles. For example, the processor monitors, in real time, statistical information associated with each of the particles. For example, the processor monitors a memory size occupied by particles in the first state or a number of particles in the first state for each frame.

In operation 1140, the processor compares the statistical information to a threshold. The processor compares the monitored statistical information to a threshold set for a type of the statistical information. In one example, the processor determines whether the number of particles in the first state is less than a predetermined number. In another example, the processor determines whether a memory size occupied by particles in the first state is less than a predetermined memory size.

In operation 1150, the processor adjusts a state transition condition in response to the statistical information being less than the threshold. When the statistical information is less than the threshold, the processor adjusts the state transition condition to increase a number of particles that transition to the first state.

In one example, the processor adjusts any one or any combination of any two or more of a size, a shape, and a position of a space that is set in a scene and in which the state of the particle in the second state is set to be changed to another state. For example, referring back to FIG. 9, the processor increases a size of the space 960 to increase a number of particles that transition from the second state to the third state.

In another example, the processor increases a probability of a transition to the first state as described above with reference to operation 340 of FIG. 3. In this example, the processor increases a number of particles that transition from the third state to the first state by increasing the probability of the transition to the first state.

For convenience of description, operation 1150 is performed after operation 1120 as shown in FIG. 11, but is not limited thereto. When particles in the first state are determined to be insufficient during monitoring of the statistical information in real time in operation 1130, the processor may skip operation 1120 to perform operation 1150.

In operation 1160, the processor performs a transition between states of the particles. For example, the processor changes particles in the second state to be in the first state or the third state based on the state transition condition using a result of applying the movement model in operation 1120. In this example, the processor allows a portion of the particles in the second state to remain unchanged.

The processor continues to apply the movement model to the particles in the second state and the particles in the third state in operation 1120. In response to the particles in the second state and the particles in the third state being maintained, the processor continues to apply the movement model to the particles. For example, in operation 1120, the processor applies the movement model to a particle changed to be in the third state in operation 1160. In this example, based on a result of operation 1120, the processor changes a state of the particle in the third state to the first state.

The processor stores the particles in the first state in a first-state particle pool 1190 in a memory. The particles stored in the first-state particle pool 1190 are maintained in the memory until the particles are retrieved to flow in the scene in operation 1110.

Figure 12:
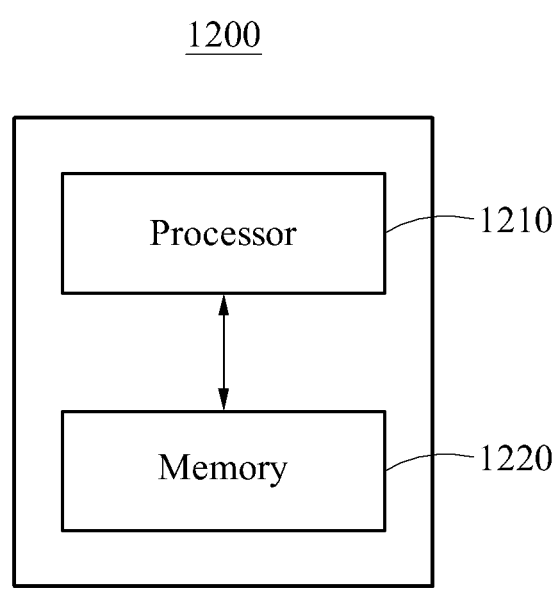
FIGS. 12 and 13 illustrate examples of a configuration of an apparatus for modeling an object.
Figure 13:
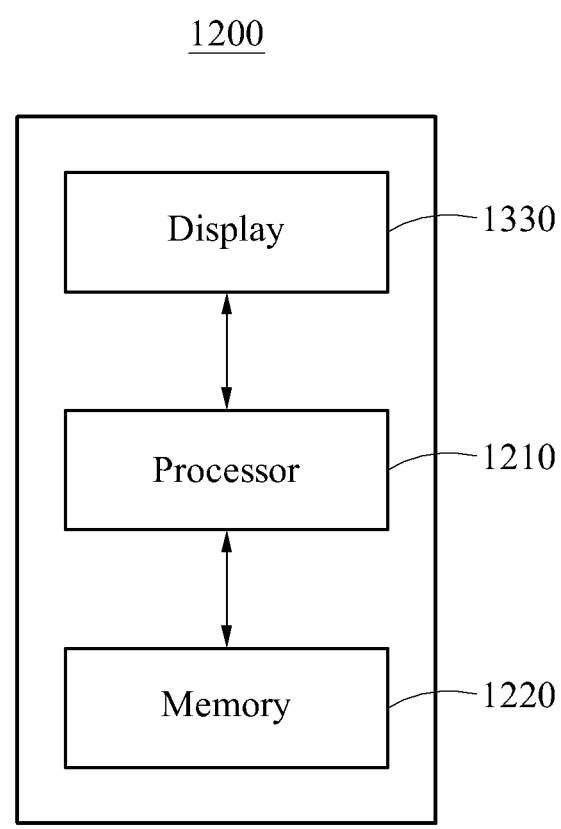

FIGS. 12 and 13 illustrate examples of a configuration of an apparatus 1200 for modeling an object.

Referring to FIG. 12, the apparatus 1200 includes a processor 1210 and a memory 1220. The apparatus 1200 may be implemented in, for example, a mobile device or a stationary device. The mobile device may be, for example, a smartphone, and the stationary device may be, for example, a desktop personal computer (PC).

The processor 1210 defines a state transition probability and a state of each of a plurality of particles forming an object for each frame, changes a state of a particle defined to be in a first state among the plurality of particles to a second state, applies a movement model to a particle defined to be in the second state among the plurality of particles, and changes a state of the particle defined to be in the second state to the first state based on a state transition probability.

The memory 1220 stores particles. The memory 1220 individually manages the particles in each state. For example, the memory 1220 generates and manages a particle pool associated with particles in the first state, and the processor 1210 dynamically adjusts a size of the particle pool. However, the processor is not limited thereto, and accordingly the processor 1210 may generate and manage a particle pool associated with particles in another state. The memory 1220 stores particles corresponding to a predetermined size of the memory 1220, and the processor 1210 represents the object while dynamically changing a state of a number of particles determined based on a limited memory size.

Referring to FIG. 13, the apparatus 1200 further includes a display 1330. The display 1330 represents the object based on particles in the second state and particles in the third state.

The above-description of FIGS. 1 through 11 is also applicable to an operation of each of the processor 1210, the memory 1220 and the display 1330, and accordingly is not repeated herein. The apparatus 1200 effectively represents a fluid flow with a relatively high complexity of a simulation even though the apparatus 1200 is implemented as an apparatus (for example, a mobile device) that has limited hardware resources and frequently interacts with a user.

The memory 490, the apparatus 1200 for modeling an object, the processor 1210, the memory 1220, and the display 1330 illustrated in FIGS. 4, 12, and 13 that perform the operations described herein with respect to FIGS. 1-13 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-13. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, 8, and 11 that perform the operations described herein with respect to FIGS. 1-13 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of modeling an object in a virtual space, the method comprising:
    determining a state transition probability for a plurality of particles, each of the plurality of particles having a set state;
    changing respective states of multiple particles, in a first state and among the plurality of particles, to a second state;
    modeling, for the object and in the virtual space, respective movements of particles in the second state, including the multiple particles in the second state; and
    dependent on the modeling of the movement of the particles, selectively changing a state of one or more of the particles in the second state to the first state dependent on the state transition probability.

2. The method of claim 1, further comprising dynamically adjusting the state transition probability dependent on statistical information associated with at least particles in the first state.

3. The method of claim 2, wherein the dynamic adjusting of the state transition probability comprises:
    monitoring a memory size occupied by the particles in the first state; and
    selectively adjusting the state transition probability based on the monitored memory size.

4. The method of claim 2, wherein the dynamic adjusting of the state transition probability comprises:
    comparing the statistical information to a preset threshold; and
    determining the state transition probability based on a result of the comparing.

5. The method of claim 4, wherein the determining of the state transition probability based on the result of the comparing comprises:
    increasing a probability of a transition of a particle to the first state in response to the statistical information being less than the threshold; and
    decreasing the probability of the transition of the particle to the first state in response to the statistical information being equal to or greater than the threshold.

6. The method of claim 1, wherein the changing of the respective states of the multiple particles to the second state further comprises setting a position and a velocity of a particle changed to the second state to be an initial position and an initial velocity of the particle changed to the second state in a scene, and wherein the modeling of the respective movements of the particles includes consideration of the set position and set velocity of the particle changed to the second state.

7. The method of claim 6, further comprising maintaining constant a memory size occupied by the particles in the second state.

8. The method of claim 1, further comprising:
    changing, dependent on the modeling of the respective movements of the particles in the second state, a state of at least one particle in the second state to a third state dependent on the state transition probability; and
    modeling, in the virtual space, respective movements of particles in the third state, and dependent on the modeling of the respective movements of the particles in the third state, selectively changing a state of one or more particles in the third state to the first state dependent on the state transition probability.

9. The method of claim 8, wherein the changing of the state of the at least one particle in the second state to the third state comprises selectively changing the state of the at least one particle in the second state to the third state dependent on the state transition probability and in response to the at least one particle in the second state being modeled as interacting with another object in the virtual space.

10. The method of claim 8, wherein the third state is a state that is transitioned from the second state and in which particles represent a subordinate flow of a fluid in the virtual space, such that the second state is a primary flow state and the third state is a subordinate flow state.

11. The method of claim 1, further comprising defining any one or any combination of any two or more of a size, a material, a shape, and a property of each of the plurality of particles.

12. The method of claim 1, wherein the changing of the respective states of the multiple particles to the second state comprises changing, from the first state to the second state, a total number of particles in the first state equal to a total number of particles designated for each frame of a scene.

13. The method of claim 1, further comprising displaying the object based on a result of the modeling of the movements of the particles.

14. The method of claim 1, wherein the object is a fluid represented in the virtual space, and the particles are used to represent the fluid.

15. The method of claim 1, wherein the first state is a state in which a particle is temporarily stored in a memory subsequent to a previous representation of the particle in a scene having been terminated.

16. The method of claim 1, wherein the second state is a state in which particles represent a representative flow of a fluid in the virtual space.

17. A non-transitory computer-readable medium storing instructions to cause computing hardware to perform the method of claim 1.

18. A processor implemented method of modeling an object in a virtual space, the method comprising:
changing a state of at least one particle, of plural particles in a first state, to a second state, the first state being a state of particles that are not represented in the virtual space, and the second state being a state of particles that are represented in the virtual space;
modeling movement, in the virtual space, of multiple particles in the second state, including the at least one particle;
dependent on the modeling of the movement of the multiple particles, selectively changing a state of one or more particles in the second state to the first state dependent on a state transition condition; and
generating the object based on a result of the modeling of the movement of the multiple particles in the second state.

19. The method of claim 18, further comprising, in response to a particle in the second state having been modeled in the modeling as reaching a predetermined space in a scene, changing a state of the particle to another state.

20. The method of claim 18, further comprising changing a state of a particle in the second state to another state, dependent on a state transition probability and in response to the particle in the second state having been modeled in the modeling as interacting with another object.

21. The method of claim 18, further comprising:
monitoring statistical information associated with the plurality of particles; and
dynamically adjusting the state transition condition based on the monitored statistical information.

22. The method of claim 21, wherein the dynamic adjusting of the state transition condition comprises:
comparing the statistical information to a preset threshold; and
selectively adjusting the state transition condition based on a result of the comparing.

23. The method of claim 21, wherein the dynamic adjusting of the state transition condition comprises selectively adjusting any one or any combination of any two or more of a size, a shape, and a position of a space that is set in a scene and in which a state of a particle in the second state is set to be changed to another state dependent on a state transition probability.

24. The method of claim 18, further comprising modeling, for the object in the virtual space, respective movements of corresponding particles in the second state that have remained in the second state in successive performances of the modeling of the respective movements of the corresponding particles.

25. The method of claim 18, further comprising:
dependent on the modeling of the movement of the multiple particles, selectively changing a state of another one or more particles in the second state to a third state dependent on the state transition condition, the third state being another state of particles that are represented in the virtual space;
modeling movement of the other one or more particles in the third state; and
dependent on the modeling of the movement of the other one or more particles, selectively changing the state of at least one of the other one or more particles in the third state to the first state dependent on the state transition condition,
wherein the generating of the object comprises generating the object based on results of the modeling of the movement of the multiple particles and the modeling of the movement of the other one or more particles.

26. The method of claim 18, wherein the changing of the state of the at least one particle to the second state comprises:
changing, to be in the second state, a total number of particles in the first state equal to a total number of particles designated for each frame of a scene; and
setting respective positions and velocities of the particles changed to be in the second state to be corresponding initial positions and initial velocities in the scene.

27. The method of claim 18, wherein the changing of the state of the at least one particle to the second state comprises defining any one or any combination of any two or more of a size, a material, a shape, and a property of the at least one particle in the second state.

28. The method of claim 18, further comprising maintaining constant a memory size occupied by particles in the second state.

29. The method of claim 18, further comprising displaying the generated object.

30. A non-transitory computer-readable medium storing instructions to cause computing hardware to perform the method of claim 18.

31. A processor implemented method of modeling objects in a virtual space, the method comprising:
wherein states of a plurality of particles for forming a fluid are dynamically set as being one of a first state, a second state, and a third state, the first state being a state of particles that are not represented in the virtual space, and the second state and the third state being states of particles that are represented in the virtual space,
respectively modeling, in the virtual space, movement of multiple particles in the second state and multiple particles in the third state; and
representing the fluid in the virtual space based on the respectively modeled movement of the particles in the second state and the particles in the third state.

32. The method of claim 31, further comprising maintaining constant a memory size occupied by the multiple particles in the second state.

33. The method of claim 31, further comprising dynamically maintaining a memory size occupied by particles in the first state.

34. The method of claim 31, further comprising dynamically maintaining a memory size occupied by the multiple particles in the third state.

35. The method of claim 31, further comprising maintaining constant a sum of a memory size occupied by particles in the first state and a memory size occupied by the multiple particles in the third state.

36. The method of claim 31, further comprising maintaining constant a sum of a memory size occupied by particles in the first state, a memory size occupied by the multiple particles in the second state, and a memory size occupied by the multiple particles in the third state.

37. The method of claim 31, further comprising maintaining constant a number of particles in the first state.

38. The method of claim 31, further comprising maintaining constant a sum of a total number of particles in the first state, a total number of the multiple particles in the second state, and a total number of the multiple particles in the third state.

39. The method of claim 31, wherein the second state is a state corresponding to a representative primary flow of the fluid.

40. The method of claim 39, wherein the third state is a state corresponding to a subordinate flow of the fluid.

41. A processor implemented method of modeling an object in a virtual space, the method comprising:
   modeling movement of particles for defining the object in the virtual space; and
   dependent on the modeling of the movement of the particles, selectively changing respective states of some of the particles dependent on a dynamically set state transition probability, wherein particles of the particles in a first state of the respective states do not define the object in the virtual space.

42. The method of claim 41, further comprising:
   selecting multiple particles from a pool of a plurality of particles in the first state;
   changing respective states of the selected multiple particles from the first state to a second state; and
   the modeling of the movement of the particles includes defining the object by modeling the movement of at least the selected multiple particles with the changed respective states.

43. The method of claim 42, wherein the changing of the respective states of the selected multiple particles comprises selectively changing a state of one or more of the some of the particles from the second state to a third state dependent on a first state transition probability, and selectively changing a state of one or more of the some of the particles from the second state to the first state dependent on a second state transition probability.

44. The method of claim 43, further comprising, at predetermined intervals to simulate a corresponding change in a configuration of the object over a period of time, repeat
   a performing of the modeling of the movement, for corresponding particles in the second and third states, and
   a performing of the selective changing, for respective states of some of the corresponding particles dependent on a correspondingly dynamically set state transition probability.

45. The method of claim 44, wherein the selective changing of the respective states of the some of the particles further comprises changing a state of at least one of the some of the particles, from the third state to the first state dependent on a third state transition probability.

46. The method of claim 45, further comprising adjusting any one or any combination of any two or more of the first state transition probability, the second state transition probability, and the third state transition probability to maintain a total number of particles in the second state constant.

47. The method of 45, further comprising:
   comparing a total number of particles in the first state remaining in the pool to a threshold each time the selective changing is performed; and
   selectively adjusting any one or any combination of any two or more of the first state transition probability, the second state transition probability, and the third state transition probability based on a result of the comparing.

48. The method of claim 47, wherein the selective adjusting comprises:
   adjusting any one or any combination of any two or more of the first state transition probability to decrease a probability that a state of a particle in the second state will change to the third state, the second state transition probability to increase a probability that a state of a particle in the second state will change to the first state, and the third state transition probability to increase a probability that a state of a particle in the third state will change to the first state, in response to the total number of particles in the first state remaining in the pool being less than the threshold; and
   adjusting either one or both of the first state transition probability to increase a probability that the state of the particle in the second state will change to the third state, the second state transition probability to increase a probability that the state of the particle in the second state will change to the first state, and the third state transition probability to decrease a probability that the state of the particle in the third state will change to the first state, in response to the total number of particles in the first state remaining in the pool being greater than or equal to the threshold.

49. The method of claim 1, further comprising defining respective states of each of the plurality of particles, such that a total number of particles defined to be in the first state equals to a total number of particles designated for each frame of a scene.

50. The method of claim 1, wherein, particles in the first state are particles that exist but are not represented in the virtual space with respect to the modeling of the respective movements of the particles in the second state.

51. The method of claim 1, wherein the changing of the respective states of the multiple particles to the second state includes changing all particles in the first state to the second state.

* * * * *